(12) United States Patent
Roux et al.

(10) Patent No.: US 12,557,744 B2
(45) Date of Patent: Feb. 24, 2026

(54) SYSTEM AND METHOD FOR GUIDING USERS IN WATERING PLANTS

(71) Applicant: Water When LLC, Bend, OR (US)

(72) Inventors: Romain Roux, Vancouver (CA); Varda Treibach-Heck, Bend, OR (US)

(73) Assignee: WaterWhen LLC, Bend, OR (US)

( * ) Notice: Subject to any disclaimer, the term of this patent is extended or adjusted under 35 U.S.C. 154(b) by 0 days.

(21) Appl. No.: 18/741,563

(22) Filed: Jun. 12, 2024

(65) Prior Publication Data

US 2025/0380652 A1     Dec. 18, 2025

(51) Int. Cl.
*A01G 27/00*          (2006.01)
*A01G 27/02*          (2006.01)

(52) U.S. Cl.
CPC ......... *A01G 27/003* (2013.01); *A01G 27/008* (2013.01); *A01G 27/02* (2013.01)

(58) Field of Classification Search
CPC .... A01G 27/003; A01G 27/008; A01G 27/02; A01G 25/16; A01G 25/167
USPC ................................................. 47/48.5, 59 R
See application file for complete search history.

(56) References Cited

U.S. PATENT DOCUMENTS

| | | | | | |
|---|---|---|---|---|---|
| 4,078,625 | A | * | 3/1978 | Loeb | A01G 27/003 |
| | | | | | 177/233 |
| 5,241,786 | A | * | 9/1993 | Burns | A01G 24/18 |
| | | | | | 47/79 |
| 6,198,398 | B1 | * | 3/2001 | Velasquez | A01G 25/167 |
| | | | | | 47/79 |
| 6,202,479 | B1 | * | 3/2001 | Frybarger | G01N 33/246 |
| | | | | | 73/304 C |
| 6,295,865 | B1 | * | 10/2001 | Cherry | A01G 27/008 |
| | | | | | 73/76 |
| 7,337,580 | B2 | * | 3/2008 | Han | A01G 27/003 |
| | | | | | 73/73 |
| 8,584,397 | B1 | * | 11/2013 | Marsh | A01G 27/005 |
| | | | | | 47/79 |
| 8,862,276 | B2 | * | 10/2014 | Schmidt | A01G 25/167 |
| | | | | | 307/118 |
| 9,775,308 | B2 | * | 10/2017 | Schmidt | A01G 25/167 |
| 10,996,179 | B2 | * | 5/2021 | Wolleben | G01V 3/06 |
| 11,168,454 | B2 | * | 11/2021 | Nichols | E02D 3/10 |
| 11,346,832 | B2 | * | 5/2022 | Koch | G01N 33/246 |
| 12,295,297 | B1 | * | 5/2025 | Kadur | A01G 25/167 |
| 12,336,463 | B1 | * | 6/2025 | Fillingim | A01G 25/167 |
| 2007/0089366 | A1 | * | 4/2007 | Kasatshko | A01G 27/008 |
| | | | | | 47/81 |

(Continued)

*Primary Examiner* — Timothy D Collins
*Assistant Examiner* — Maria E Graber
(74) *Attorney, Agent, or Firm* — Jeffrey Pearce

(57)          ABSTRACT

A method and system for maintaining plants, where each plant is in a container with a growing medium, includes determining a drying profile that is a function of elapsed time from a time of an initial watering state. The drying profiles may be species-specific and may also indicate total weight of the plant, container and growing medium over elapsed time; drying profiles may also be made dependent on various environmental factors. An estimate is made of when the wetness level in the growing medium will fall below a predetermined minimum level as indicated by the drying profile. An indication is given to a user of a need to water the plant when the wetness level is estimated to reach, or has already reached the predetermined minimum level.

16 Claims, 8 Drawing Sheets

(56)                    References Cited

U.S. PATENT DOCUMENTS

| | | | |
|---|---|---|---|
| 2013/0174484 A1* | 7/2013 | Rhoads | A01G 27/02 |
| | | | 47/80 |
| 2017/0316124 A1* | 11/2017 | Lee | A01B 79/005 |
| 2020/0326716 A1* | 10/2020 | Nichols | G05D 22/02 |
| 2022/0408666 A1* | 12/2022 | Nash | A01C 21/007 |
| 2025/0113790 A1* | 4/2025 | Kovalsky | A01G 25/167 |
| 2025/0277753 A1* | 9/2025 | Moran | G01N 33/246 |

* cited by examiner

Figure 14:
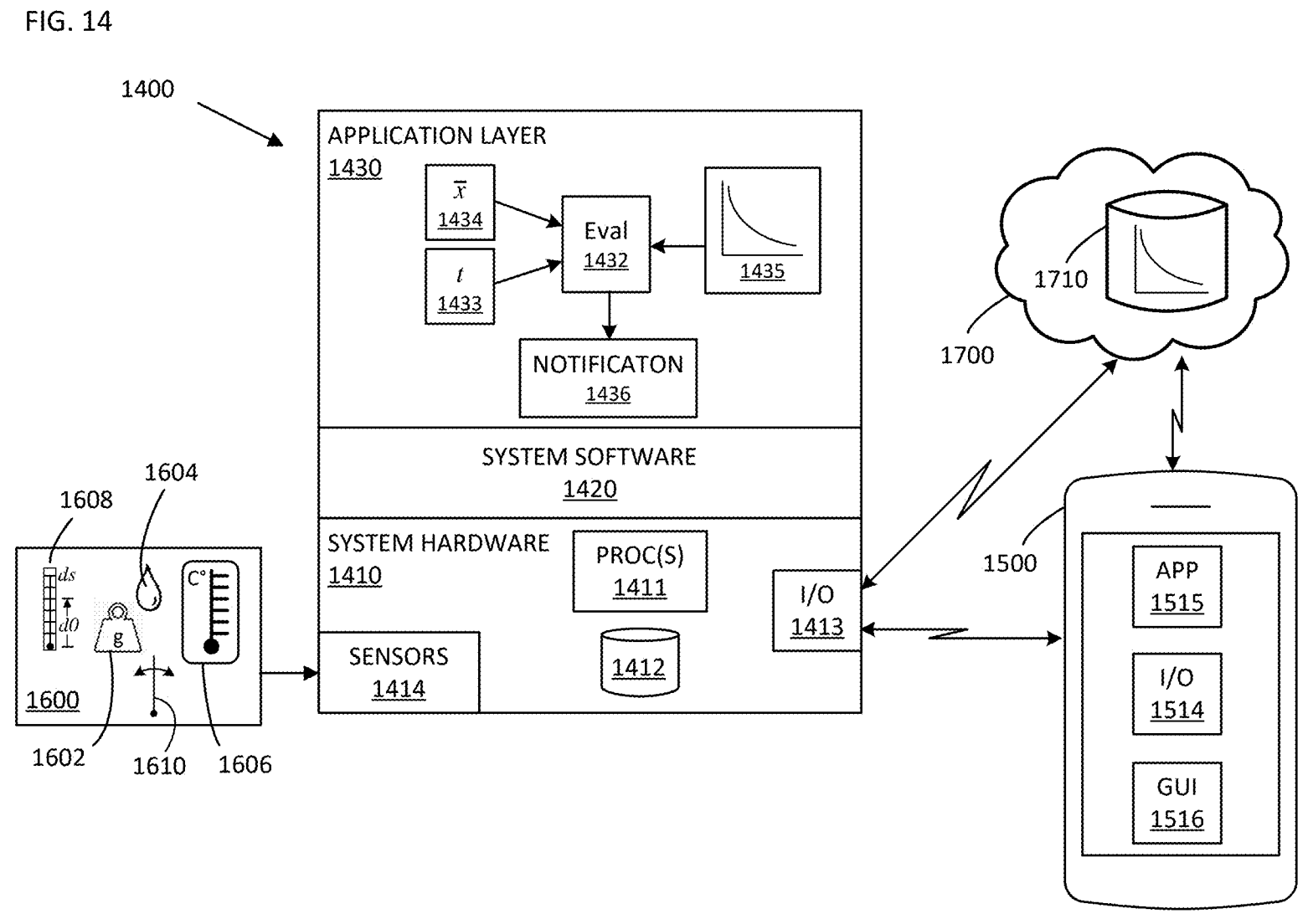

APP
1515

I/O
1514

GUI
1516

APPLICATION LAYER
1430

1435

Eval
1432

NOTIFICATON
1436 x̄
1434 t
1433

SYSTEM SOFTWARE
1420

SYSTEM HARDWARE
1410

PROC(S)
1411

1412

I/O
1413

SENSORS
1414

1608

1604

1600

1602

1610

1606

C° ds

00

SYSTEM AND METHOD FOR GUIDING USERS IN WATERING PLANTS

TECHNICAL FIELD

This invention relates to potted plant maintenance.

BACKGROUND ART

Several factors can affect how often a potted plant needs to be watered, including the type of plant, the size of the pot, the type of growing medium, the environmental conditions, seasonal changes, plant growth stage and other factors. Different plants have different water requirements. For example, succulents and cacti require less water and longer dryness periods than tropical plants like ferns or lilies.

The size of the pot usually affects how much growing medium and water the plant can hold. A smaller pot will dry out faster than a larger one, and thus, the plant may need to be watered more frequently. The type of growing medium also affects how well water is retained. Some soils, like peat-based mixes, hold water well, while others, like sandy soils, drain quickly.

Environmental factors like temperature, humidity, and airflow can affect how quickly the soil dries out. In a dry, hot environment, the soil may dry out faster, and thus, the plant may need more frequent watering. Plants typically also have different water requirements during different seasons. During the winter, when plants are dormant, they may require less frequent watering, while during the summer, when temperatures are higher and light is longer, they may require more frequent watering.

Newly planted or transplanted plants may require more frequent watering until their roots are established. Similarly, plants that are in direct sunlight, actively growing or flowering or under grow lights may require more water more often than those that are not. This means that oftentimes, a regular watering schedule, where all plants are watered at the same time, is not optimal for plants that prefer to reach an individual dryness profile and then be watered until they flush.

Some known systems that attempt to aid a user in determining when to water a plant rely on soil moisture sensors, which are devices that are inserted into the soil near the plant's roots. Such sensors are often unreliable, however, for reasons of both environment and construction.

Inherently, soil retains moisture from the air through a process called hygroscopic absorption. Soils with higher clay and organic matter content tend to retain moisture and environmental conditions like humidity enable soil to absorb even more moisture; however, this is not the type of moisture to sustain a plant's needs. Additionally, the sensors that rely on resistivity corrode over time, which causes measurements to drift and become inaccurate. One common alternative relies on capacitive sensors instead, but these are typically in a fiberglass/PBC housing that delaminates and also suffers from degraded measurement accuracy over time. Finally, most probing meters have a fixed length that will change the moisture readings depending on the depth of measurement. As was discussed earlier, some of this measurement will contain moisture from the air.

As can be understood, it can be quite challenging to know when to water each of one's potted plants, and to also know how much water to provide to maintain optimal plant health.

BRIEF DESCRIPTION OF THE DRAWINGS

FIG. 14 shows an example of data processing system.

DETAILED DESCRIPTION

Figure 1:
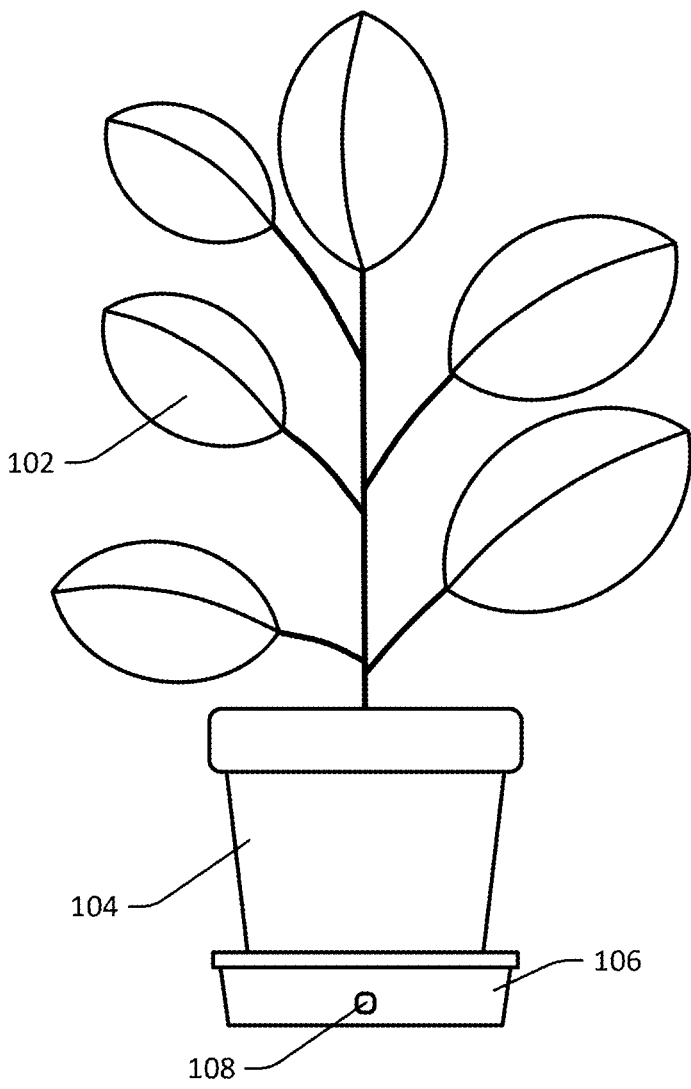
FIG. 1 shows a potted plant sitting on the PWM system showing the plant status indicator.

For convenience, different embodiments of the invention are referred to below generally as the "PWM" system or "PWM" method, where "PWM" is an acronym for "Plant Water Management". Different features are described below, any combination or all of which may be included in implementations of the invention; common to all these features is that they contribute to helping a user maintain a proper amount of water for a plant, in particular, a plant in a container such as a pot, tray, planter, etc. Unless stated otherwise, the term "potted plant" is used below to indicate a plant in any type of container, which may, similarly, only for succinctness, be referred to as a "pot".

In this disclosure, "water" is to be understood to refer to all three normal phases, namely, liquid, including moisture, solid (ice) and gas (water vapor), and also includes nutrient transport. Exceptions to this default interpretation will be either stated or clear from context. Similarly, for the sake of simplicity and succinctness, and unless otherwise indicated or inferable, the word "soil" should be read as meaning any type of medium in which a plant is meant to grow.

Embodiments of the PWM system disclosed herein include a controller and one or more sensors for characteristics such as weight, water overflow, water saturation, pH measurement, nutrient content, soil composition and balance, and environmental factors such as temperature, humidity, ambient/barometric pressure, wind speed/pressure, precipitation, machine vision and sunlight intensity. The PWM system also includes one or more devices or arrangements for indicating to the user such information as when the plant needs to be watered, when the plant has sufficient water, when the user has added water to a saturation level in the container, when the user needs to alter the pH level of the soil, when the user needs to alter the nutrient concentration being fed to the plant, when the user needs to alter soil composition including micronutrients, and sensors that will alert the user when there is a material imbalance with the plant, container, growing medium, and water, such that there is a risk that the plant will tip over, or that it has, in fact, tipped over. Pressure sensors may be used to better predict evaporation rates for the user and can be used in conjunction with light, humidity, and temperature sensors to achieve the same thing.

Note that some of these sensors will be advantageous only in situations in which the plant being monitored is outside, which is in fact an option—the invention is not limited to indoor plants. Wind speed/pressure sensors may, for example, alert users to strap down or relocate plants in case of unusually high winds, which may help prevent damage to plants and pots, including surrounding plants or objects not being monitored by the PWM. Increased wind speed will also tend to increase evaporation, depending on humidity, which can affect and require adjustment of the plant's drying profile (see below), especially if the profile was determined indoors. Because factors such as wind may fluctuate and cause the system to "overreact", such as during gusts, the system may also apply any known smoothing algorithm to remove such short-term effects; as just one example, a moving average with a predetermined time window may be applied.

Precipitation sensors can help determine where the source of water into the plant system is coming from. This may in turn allow for better nutrient intake adjustments; for example, if each watering event requires a certain concentration of nutrients in the soil that is fed by the PWM system, then this nutrient concentration may need to be increased if a full watering quantity was provided via precipitations instead of normal controlled watering by the PWM. Precipitation may of course also affect the amount of water in the soil or on the plant, changing the total weight. The system may then take a precipitation-induced weight increase into account in determining where on a dryness profile (see below) the plant should be assumed to lie.

Note that precipitation may occur "indoors" as well as outdoors, for example if the plant is in a greenhouse that has a drip or other type of watering system. Even in such an environment, the invention may be advantageous by enabling more precise and species-specific watering profiles and warnings than a one-for-all drip system may provide.

In some embodiments, the components of the PWM system perform one or more of these functions automatically. In some embodiments, the components of the PWM system that are in contact with the potted plant are communicating with a user via an application in the user's phone, laptop, etc. In those embodiments, the PWM system will therefore comprise two cooperating systems—one with the potted plant and the other with the user, that is, remote. In other embodiments, the sensors of the PWM system that are in contact with the potted plant are communicating with a user via a local user interface.

Initially, an embodiment that relies on weight is described, after which other embodiments will be described. Note that several of the different embodiments are mostly distinguished by what they sense and what information they provide to the user, and how, and that they may, therefore, in most cases, be combined depending on which features are to be included in a given implementation of the invention.

FIG. 1 shows potted plant 102 in pot 104 sitting in a saucer 106, with an indicator or notification device 108, which may inform the plant owner when to water the plant. Although not illustrated, it is to be assumed that there is soil or any other nutrient substrate in the pot. Nutrient substrates such as, for example, vermiculite, could include a hydroponic configuration whereby the PWM's main task is more focused on plant growth and media solution optimization and less on watering cycles. As is illustrated in other figures, there will also be a base component that houses at least some sensors and other components as needed, depending on the implementation. In FIG. 1, the base component is not visible and is located within the saucer, under the pot; in other implementations, it would be possible to design the base component as a saucer, or the base component could even be incorporated within the plant container itself. Although not visible, in most designs, the pot 104 will have at least one drainage hole in the bottom, or near the bottom on the sides.

For the sake of succinctness, unless otherwise made plain, the term "the potted plant" is used below to refer to the plant container (such as a pot), the plant itself, the growing medium, any water held by the growing medium, the saucer or a water reservoir, and any other items that may be included within or attached to the pot or plant, such as support sticks, labels, decorations, etc. Some users also like to put the pot that holds growing medium into yet another more decorative pot or shell and as long as this includes a saucer or has a saucer on the platform (see below) this should also be included in the term "potted plant". In short, anything that contributes to a weight measurement used to determine the need or the amount of water, proper balance, etc., may be considered to be included as part of the "potted plant. Note that, in embodiments that base watering decisions on weight, removal or addition of optional items such as sticks, labels, decorations, etc., or the picking of its leaves or fruit and flowers, will cause sudden changes in total weight above the standard deviation and may trigger notification(s) to the user that require the user to respond so that either the user corrects the situation, manually recalibrates, or, communicates to the system such that the system performs an auto-calibration.

The term "PWM system" refers generally to the components other than the potted plant that perform and process any required measurements used to determine the dryness profile of the plant. In some cases, however, there may be some overlap in the terms and a component may be part of both the "potted plant" and also the "PWM system". For example, if a temperature probe is inserted into the soil, then it will contribute to both the weight being measured and to the measurements being processed.

The indicator/notification device 108 may be a light, and/or the indicator may be a sound, such as a beep, or a module that transmits a signal to cause an alert at a remote device such as a mobile phone, tablet, or computer, in which the PWM data can be accessed.

In a simple embodiment, the indicator may comprise one or more lights, for example, a single LED that remains solid or flashes depending on the watering condition, or LEDs of different colors. As one intuitive choice, green may indicate that the plant does not need water, orange may indicate that the plant will need water soon, and red may indicate that the plant needs water. What "soon" is can be determined in various ways, for example, based on a drying profile, as described below, or simply that a measurement by a growing medium probe indicates that the wetness percentage is at the lower end of a predetermined range. Such a growing medium measurement sensor may be either electronic, and connected to the measurement and control circuitry, or simply manual, such as a finger, a pencil, or a bamboo stick.

In some embodiments, the PWM system includes a stick that may be made out of plastic and may react to a soil's meaningful moisture level by providing a visual indication of the wetness gradient in the growing medium. This visual change may be achieved through a reactive reveal color changing, hydrochromic coating that corresponds to the wetness gradient. As an alternative, the stick could be provided with grooves in which wet soil lodges to allow the user to see the wetness level in the soil.

Other colors or combinations or actions (such as flashing) may indicate other things such as an overwatered state, a fault state (such as when the plant suddenly changes weight either upwards or downwards), an undesirable electrical or connectivity state, or other events or conditions. Similarly, sound, email, SMS, mobile phone alerts, or other notifications from a device that is directly or indirectly communicating with the PWM system, may consist of different sounds, words, events etc., to represent different conditions. Some of the conditions may include:

Plant needs water
Plant has sufficient water
Plant will soon need water
Plant is in dangerously dry state
Plant is overwatered
Plant has just been watered
Plant weight has changed suddenly downward
Plant weight has changed suddenly upward due to something other than watering
PWM system is in vacation mode
PWM system is in another mode
other error
other condition The PWM system may have an alert system during plant watering. The alert signal given to the user to indicate the risk of overwatering (or any other fault condition, such as imbalance), or when the proper saturation level has been reached, may be audible, visible, haptic, or any other. For example, the PWM system may provide audible sounds which change in pitch or frequency as the maximum water threshold is being approached. The audible sound may then be different when the maximum water threshold is reached.

Similarly, visual or other alerts may progress as the maximum water threshold is being approached. For example, if the indicator includes LEDs of different colors, then they could progress from red to orange and turn to green when full saturation has been reached.

The PWM system may also have a Water Assist feature that guides the user in watering the plant. One example of a method that enables this feature may proceed as follows:

Assume that the weight of the plant (plus container, soil, etc.) at saturation is known from a previous measurement and is stored in or available to the PWM system. The PWM system then begins weighing the plant (plus container and soil, etc.) and may signal the user via an interface such as indicators either on the PWM system itself, or on the user's device (such as smart phone), etc., to start watering, and, preferably, to slow down when the weight reaches a predetermined percentage of the saturation weight and, finally, to stop.

As an alternative, assume that the volume of the container is known and entered into the PWM system. If, from previous measurements, the "dry" weight and the saturation weight are known, then the volume $\delta V$ of water corresponding to the weight difference can be easily computed (since water weighs 1 kg/liter). As the user pours in water, the PWM system may then measure the current watering flow rate from the change of weight and, from that, and assuming a constant rate, compute after how many seconds $\delta V$ will have been added, and signal the user to slow down when the remaining time is less than a predetermined threshold value. As an alternative, the system may compute an estimate of when the volume of water added into the container since an initial estimate will reach a predetermined threshold, such as the volume of water in the container relative to the container's known total volume. The PWM system may then message the user if the plant is either over-watered and needs to have its saucer emptied or under watered and requires an indicated amount of water to reach its desired weight.

In yet another alternative, the user may insert a probe into the soil, if one is not already built in or otherwise included (such as the soil probe mentioned above) to indicate the percentage of the soil that is wet in relation to total amount of soil. For example, if the soil depth is ds and the probe senses wetness up to a distance d0 from the bottom, then the fraction of wetness will be d0/ds. By detecting a signal from the probe, the PWM system may then indicate to the user when the sensed wetness depth is a predetermined percentage of the previously wetness depth at saturation, which may be determined at calibration.

The Water Assist feature of some embodiments may be implemented as a software module that works with the plant platform to help the user water their plant the correct amount. The PWM system will, as in other embodiments, know the correct amount to water the plant based on its current weight versus the saturated weight. The user may then press a button on the device or otherwise initiate Water Assist. Indicators such as an array of LED lights may then light from bottom to top with varying speeds corresponding to the weight change from the user's water hitting the plant. The PWM system may then signal the user when a predetermined percentage, such as 10%, of the full saturation weight has been reached so that the user will know to slow down watering, or at least about when to stop.

The Water Assist feature may evaluate and react to and, as needed, notify the user of, different conditions. Some examples of possible conditions may include:

1. User waters evenly and the correct amount=correct watering
2. User waters evenly and the incorrect amount (too little)→User gets message to add x units of water (where x is any chosen amount, or is computed as the remainder need to full saturation
3. User waters evenly and the incorrect amount (too much)→User gets message, for example, "It appears you have overwatered, please check your water reservoir and empty"
4. User waters unevenly and the incorrect amount (too little)→User gets message to add x units of water, but if water leakage into the saucer is detected, go to condition 6.
5. User waters unevenly but with the incorrect amount (too much)→User gets message, "It appears you have overwatered, please check your water reservoir and empty"
   a. User empties saucer, but plant is not correct weight→User gets message to add x units of water as well as, optionally, an additional message such as, "You previously received an overwatering message and now your plant is under its desired weight. This is most likely from watering your plant unevenly"
6. User waters unevenly but with the correct amount; water in saucer
   a. User empties saucer, but plant is not at correct weight→User gets message to add x units of water
   b. User does not empty saucer, but plant is at correct weight i) Plant is assumed to be able to absorb it→No
message to user needed ii) Plant assumed not to be able to absorb run-
off→No message to user because user previously
told to monitor water level manually Any or all of the various techniques (depth-based, weight-
based, volume-based) may of course be combined to guide
the user, and to provide a backup for a user's watering
technique. Additionally, a water sensor may be included in
a saucer under the container to sense uneven watering of the
plant. If any water is leaking out of any drainage hole in the
container too early in the process the PWM system may
signal to the user to slow down, especially if the threshold
for the usual signal has not been reached, since this may
indicate that the water being poured into the container is too
much, too fast, and that it is not dispersing properly through-
out the soil. This will, in many cases, also relate to deter-
mining saturation, since, if a user pours the entirety of the
prescribed amount of water quickly and at only one location
into the pot, water may not have time to disperse throughout
the growing medium and may then drain into the saucer.
This may lead not only to a full saucer, but also to a false
indication of saturation, as well as some of the plant's roots
not receiving enough water. Another reason to indicate to a
user to water more slowly is so the saucer doesn't overflow,
causing potential surrounding water damage. This may be
likely to happen when a user waters plants with a sandy soil
composition, which differs from the humus soil of their other
plants.

In another embodiment, a water sensor may be provided
in the saucer 106 such that when it senses that water has run
to a predetermined level in the saucer, this is taken as the
growing medium, such as soil, having reached full satura-
tion. The system may then indicate this condition to the user.
Using the optional Water Assist feature described above, the
PWM system may thus indicate to the user to water less (or
more) quickly. In these embodiments, since the mass per unit
volume of water is of course well known, the rate at which
water is being poured into the pot can be determined by the
rate of change of weight in the potted plant.

Note that uneven dispersion of water may also lead to a
measurable change in the balance of the potted plant, which
an embodiment of the PWM system described below may
detect and then notify the user of. Once again, any chosen
indicator may be used to signal this. For example, if one or
more LEDs are included, "red" could indicate "out of
balance" and "green" could indicate "in balance"; alterna-
tively, a single LED could be caused, for example, to flash
if water is causing imbalance, or a line of LEDs could light
up above or below to show the same.

Figures 2, 3:
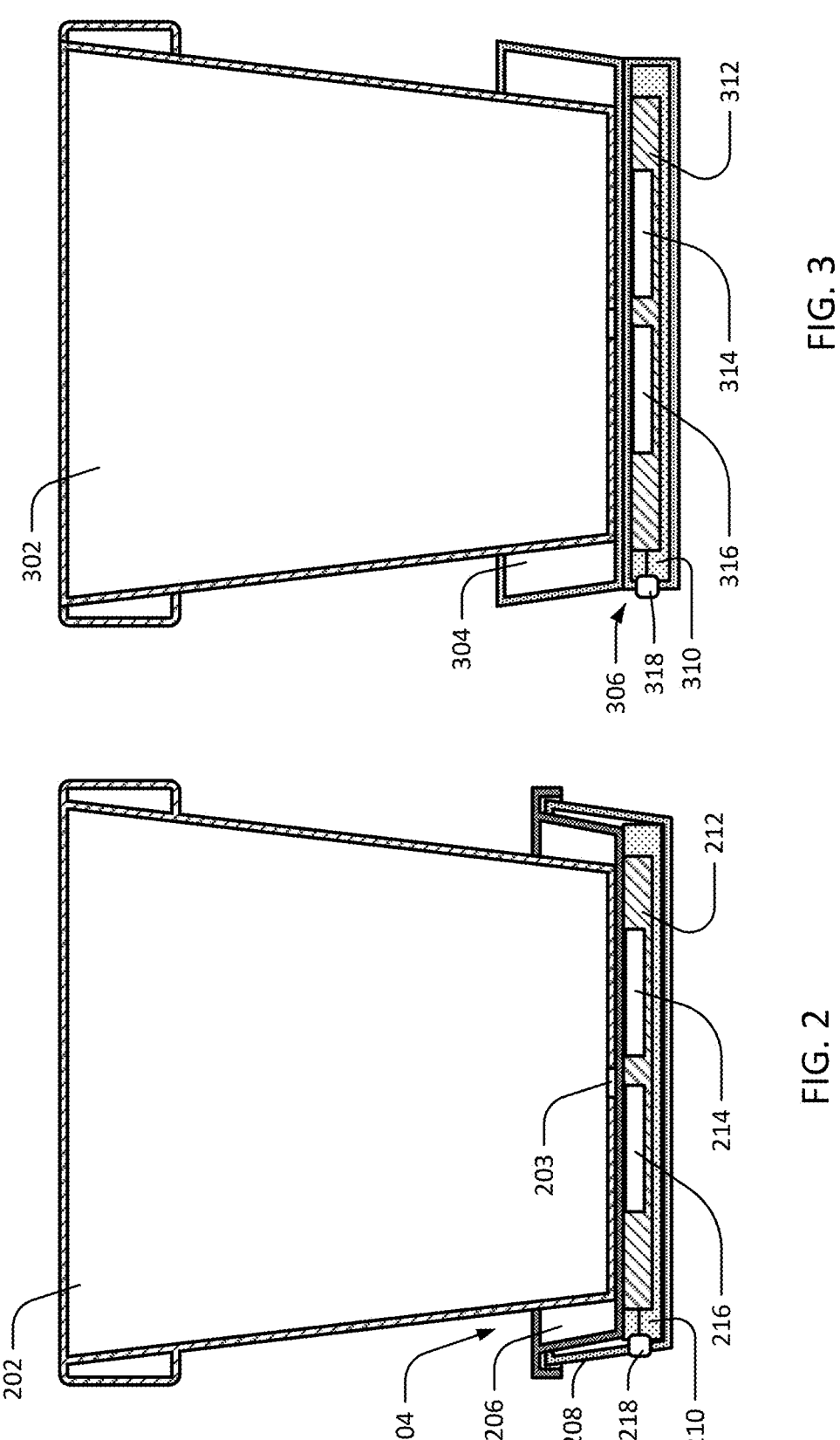
FIG. 2 shows an embodiment of the PWM system which comprises a saucer.
FIG. 3 shows an embodiment of the PWM system which comprises a platform.

FIG. 2 shows an embodiment of the PWM system in
which the saucer in which the pot 202 sits also incorporates
the PWM system. In this figure, an opening 203 is shown in
the pot 202, for water drainage into the saucer. In the
illustrated embodiment, the PWM system 204 includes a
water overflow reservoir 206 and a lower saucer component
208. Inside the lower saucer component 208, and hidden
from view, is a scale device 210, that is, an arrangement for
measuring weight, such as one or more strain gauges 214.
The scale device will typically include a printed circuit
board (PCB) 212, the weight sensor or strain gauge 214
itself, and one or more batteries 216, or other onboard
energy accumulators or external power source. Optionally, a
user interface 218 may be connected to the PCB 212, visible
to the user on the outside of PWM system 204.

The pot 202 may be the user's own pot or may be specific
to the PWM system. The saucer embodiments of the PWM system may come in a variety of sizes, shapes and finishes
to accommodate any size and weight of pot and plant.

FIG. 3 shows an embodiment of the PWM system that is
configured as a platform for the potted plant and saucer. This
embodiment thus allows users to use their own pots and/or
saucers, and place it on top of the PWM system 306, that is,
the platform. FIG. 3 illustrates the pot 302, a water reservoir/
saucer 304, and the PWM system 306, which includes the
scale device 310. The scale device 310 in turn includes PCB
312, one or more strain gauges 314 and one or more batteries
or other energy accumulators or external power source 316.
A user interface 318 may be connected to the PCB 312,
visible to the user on the outside of PWM system 306. The
platform embodiments of the PWM system may come in a
variety of sizes and finishes to accommodate any size and
weight of pot and plant. For example, the shape of the PWM
platform preferably matches at least approximately the
shape of the bottom of the pot or saucer, in particular in
embodiments that measure weight (that is, force, since
"weight" is simply a gravity-induced force) at more than one
point so as to enable symmetry or even distribution of
measuring points. Similar to the device shown in FIG. 2, the
scale 310 senses the changes in weight of the pot and the
water overflow reservoir during the different watered states
of the plant.

Figure 4:
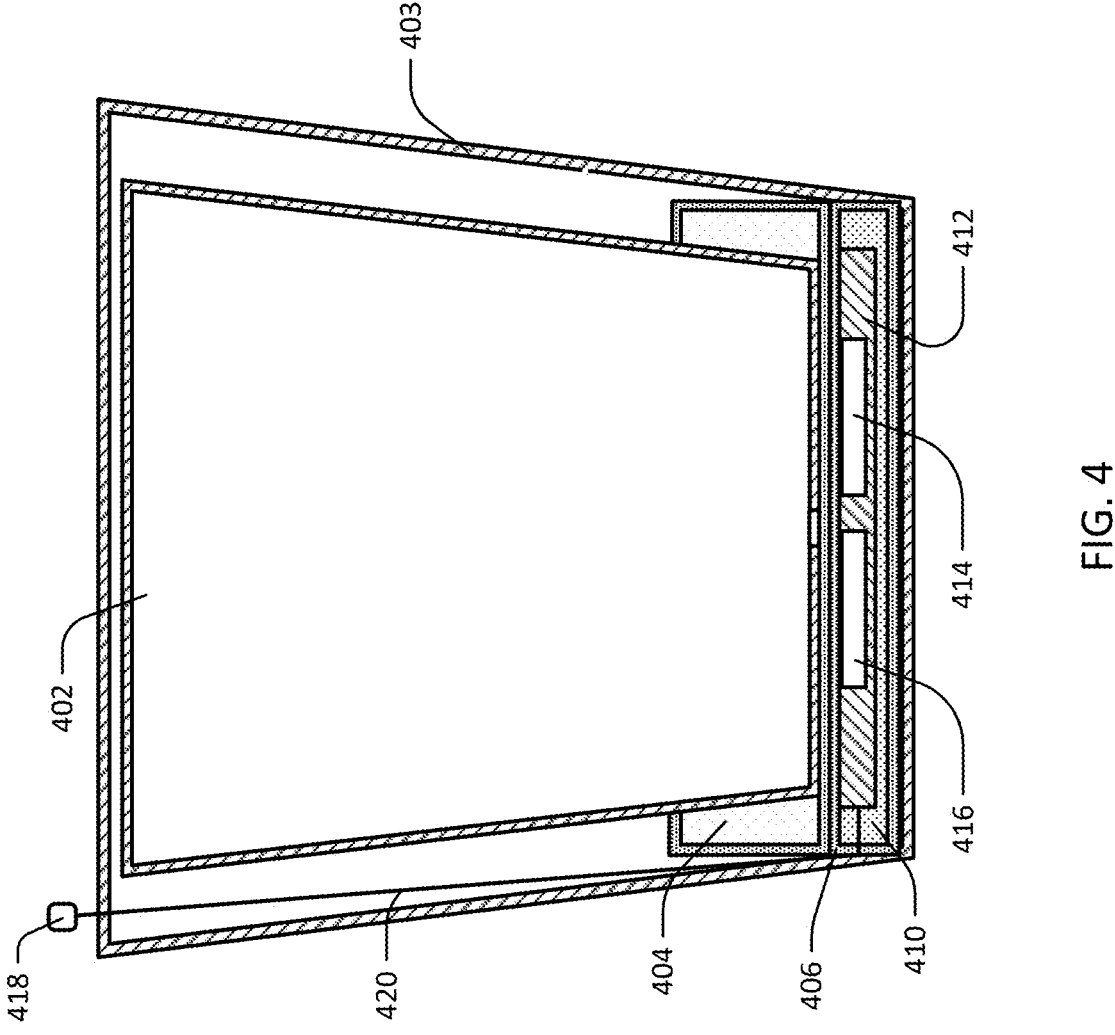
FIG. 4 shows an embodiment of the PWM system which comprises a system which can be used inside of a decorative pot.

FIG. 4 shows an embodiment of the PWM system that can
be used inside of a decorative pot 403. In this embodiment,
users may use their own pots and/or saucers, and place them
on top of the PWM system. The PWM system, as well as the
user's pot and/or saucer, may reside inside an outer deco-
rative pot. Shown here are an inner pot 402, an outer pot 403,
the water reservoir/saucer 404, and the PWM system 406,
which includes scale device 410. The scale device 410
includes a PCB 412, one or more strain gauges 414 and one
or more batteries or other energy accumulators or external
power source 416. A user interface 418 is connected to PCB
412 via connector 420 and, in this embodiment, is visible to
the user on the outside of outer decorative pot 403. A
connector 420 may be flexible and may be extendable and/or
compressible, so that user interface 418 shows above the rim
of outer pot 403. The user may also choose to have the user
interface located just inside the outer pot 403. This embodi-
ment of the PWM system may come in a variety of sizes and
finishes to accommodate any size and weight of pot and
plant, including different outer pot dimensions and shapes.
Similar to the device shown in FIG. 2, the scale 410 senses
the weight of the pot and the water overflow reservoir during
the different watered states of the plant.

Some embodiments thus include some form of surface on
which the potted plant is set, with at least one weight-
measuring device such as a strain gauge along with any
conventional accompanying circuitry (such as a conven-
tional Wheatstone bridge or the like). In one embodiment, at
least two, and preferably more weight-measuring devices
are positioned in the PWM system so as to be able to
measure weight, that is, force, at a corresponding number of
positions of the surface on which the potted plant is placed.

At the time of initial calibration, when water of the
maximum desired amount has been added to the potted
plant, the user ensures that the potted plant is suitably
balanced on the surface and indicates this to the PWM
system either directly, by pushing a button on the PWM
system itself, tapping a corresponding icon on a PWM phone
application, etc. The software of the PWM system may also
be configured to simply assume proper balance after expi-
ration of a predetermined time after initial calibration in
which no further actions are sensed. The PWM system then records the weight measurements from all, or a selected subset, of the weight-measuring devices, and this initial set of measurements is taken to indicate "in balance".

If, during monitoring of the plant, the measurements from the weight-measuring devices deviate more than a threshold amount from those initially recorded, then the PWM system may generate a warning signal (visual and/or audible), either at the plant itself, or remotely on the user's mobile application, or both. "Deviation" may be determined in different ways, with consideration taken to the fact that, over time, all measurements should decrease in accordance with the respective drying profile. As just one of many possible procedures, and by way of example only, assume that there are three force sensors, that is, weight-measuring devices $i=1,2,3$, and that the initial "in balance" measurements are $w_i(t=0)$: $w_1(0)$, $w_2(0)$ and $w_3(0)$, where "0" indicates "initial time", and that $W(0)=w_1(0)+w_2(0)+w_3(0)$. The proportional contribution of each measurement will therefore initially be $w_1(0)/W(0)$, $w_2/(0)W(0)$ and $w_3(0)/W(0)$, respectively. Over time, the three weights and thus the total weight W will of course change, but the system may in this example assume that the proportional contribution of each measurement will remain roughly the same, that is, within a predetermined percentual threshold range. One indication of imbalance may then be that the proportional contribution of any of the sensors changes by an amount that falls outside the threshold range.

Another somewhat more complicated computation to determine imbalance may be statistical: The PWM system may compute the standard deviation $\sigma_w$ of the initial "in balance" force measurements $w_i(0)$. This standard deviation computation may then be performed at intervals during subsequent operation of the PWM system as well. Any increase in $\sigma_w$ beyond a predetermined threshold value may then be taken as an indication of unacceptable imbalance and the user may then be notified of the condition.

Imbalance or tipping may also be determined using hardware devices. As one example, the PWM system may incorporate a known device that includes an inertial sensor (for example, accelerometers, a gyroscope, etc.) such as an inertial measurement unit (IMU), which, by sensing accelerations, may detect movements indicative of tipping over or weight shifting that might lead to tipping over and/or incorrect weight leading to incorrect timing of notifications that the plant is due to be watered or notifications that the plant has received the correct amount of water.

Imbalance may occur for several reasons. Some examples include: plant growth more on one side than another, or heliotropic leaning of the plant; a stem breaking off; fruit falling off of one side more than others; earthquakes or repeated shaking caused by passing heavy vehicles; bumping by a pet; water in the pot running to one side more than another because of improper initial balancing; an uneven floor, etc.

The balance-sensing feature of embodiments of the invention may also be used to improve initial watering itself. The user may be directed to place the potted plant on the sensing surface to achieve at least an initial balanced position. For example, the user may be instructed—or directed by indicators—to center the potted plant on the surface so that the different weight measurements are within a predetermined threshold amount or percentage of each other. One arrangement to guide the user to initially center and balance the potted plant on the surface may use a series of LEDs. For example, if the potted plant is balanced on the sensing surface, a center LED could be lit, whereas, if the plant needs to be moved, say, to the left, one or more LEDs to the left of center could be lit, and so on. In other words, the potted plant's placement is changed until notification that it is sufficiently balanced.

As the user then adds water to the potted plant for initial calibration, or even during later watering, they may not pour the water in evenly, or may pour it too fast, etc., such that the water is not evenly dispersed in the growing medium. This may mean that some regions—and thus roots—within the pot do not get enough water, whereas others may get too much. Such uneven water dispersion after initial balancing may then be detected as any other imbalance, and the user may then be notified accordingly of uneven water disbursement to ensure proper watering methodology.

Figures 5A, 5B:
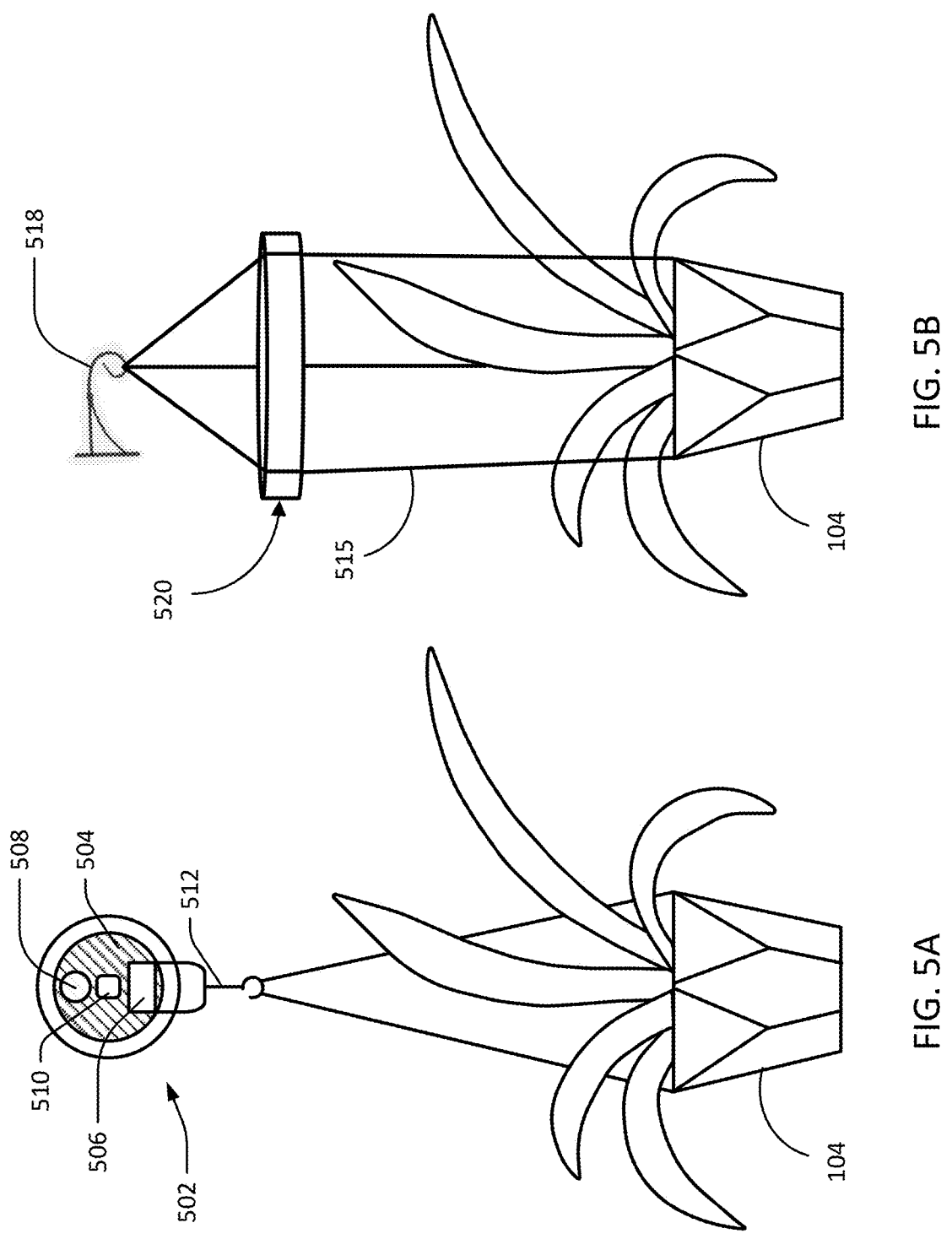
FIGS. 5A and 5B show embodiments of the PWM system which may be used with a hanging plant.

FIG. 5A shows an embodiment of the PWM system which may be used with a hanging potted plant. In this embodiment, users may use their own pots and/or saucers and/or decorative pots. Shown here is the PWM system 502, including PCB 504, one or more strain gauges 506, one or more batteries or other energy accumulators or external power source 508, optionally a user interface 510, and a hanging element 512. In this embodiment, the plant weight may be measured from above, rather than below the plant. The plant is attached to the PWM system 502 by connecting it to hanging element 512. Similar to the arrangement shown in FIG. 2, the strain gauge(s) 506 sense the weight of the potted plant (which, in this case, will include the hanging element, including any suspension wires, and any water overflow reservoir during the different watered states of the plant.

In yet another embodiment, depicted in FIG. 5B, the potted plant may be hung using any conventional bracket, hook, etc., 518 and the PWM system is incorporated into a substantially cylindrical "puck"-, spherical "ball"-, or a polygonal "plate"-like insert 520 that houses the PWM system and is attached to and between the suspension wires 515 in such a way that the weight of the potted plant causes the wires to press inward on respective strain gauges. In other words, weight is measured indirectly, as a function of the mostly lateral or radial force of the wires on the insert—the heavier the potted plant, the greater will be the inward pressure on the PWM system. Normal methods may be used to calibrate the measured strain on the gauges to actual weight of the potted plant. Other components of the PWM system may be as in other embodiments, except for any that provide a support on which the potted plant stands. One advantage of this embodiment is that users may hang their plants from existing brackets or hooks.

Figures 6, 7:
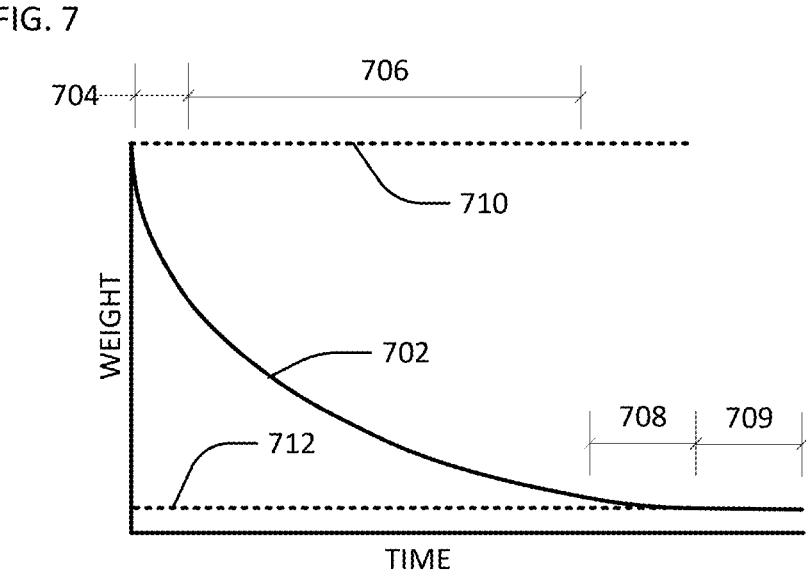
FIG. 6 shows a representative curve representing the weight of a plant over time, including the plant's pot and water reservoir.
FIG. 7 shows an example of a weight data curve for a plant that thrives better by getting completely dry between waterings, such as a cactus or succulent plant.

FIG. 6 shows a representative curve representing the weight of a potted plant over time, including any included water reservoir and any passive or active water transportation system between said reservoir and the growing medium (s). This graph represents a degree of saturation over one watering-drying cycle. In general, the drying curve represents a function $w=w(t)$, that is, weight as a function of time. As water evaporates from the soil and is transferred to the atmosphere by evapotranspiration from the plant, the weight of the potted plant will decrease. The curve may take on different shapes depending on the plant type, size, pot type or size, soil type, environment, and other factors. In the examples shown in the figures, the curves show roughly exponential decay, but this is just for illustrative purposes. For some plants, the curve may have a steeper slope in the time following watering, and a shallower slope toward the end of the watering cycle when a plant requires an interval period of dryness, or when the plant is approaching the state at which it requires watering. The shape of the drying curve will also depend on the type of soil. Shown here is steeper post watering slope 604, a mid-watering phase slope 606, and a near dry state slope 608. Also indicated here is an optimal watering level 610 and time-to-water level 612, meaning the point at which the user should water the plant.

The controller of the PWM system receives weight data from the signals of the weight sensor(s) of the device and can interpret the data to determine the hydration status of the plant. The controller may use slope, magnitude, or any other shape information from the weight data to determine the hydration status, or other conditions of the plant. The drying curve may be specific to every species or even to every potted plant.

The drying curve may be determined in different ways. One method is primarily "experimental": The user places the potted plant on the PWM system and adds water to the saturation level, which the user may determine through experience, depending on the starting wetness of the soil and the amount of water that flushes out of the bottom of a pot. After emptying excess water, the user then indicates to the PWM system, using any known method, that it is to start a calibration. If a button is included in the PWM system, then the start may be indicated by pressing it. Alternatively, the PWM system could determine the time of saturation automatically and begin the calibration cycle, for example, by sensing water draining into the saucer, or filling the saucer to some predetermined level (to provide a predetermined water reservoir). Another way would be for the PWM system to assume it is to start a calibration cycle as soon as it senses an abrupt weight increase—many kitchen and bathroom scales, for example, know to start a measurement as soon as enough weight is placed on them and a similar technique could be used by the PWM system.

Determining when the plant needs to be watered may also be done in different ways. In the simplest case, the user waits until determining, based on experience or using some indicator, that the plant must be watered, at which time the user indicates to the PWM system to set the lower bound of the dryness calibration, which will be the dryness target for future cycles. It may also be done by placing a PWM implement into the growing medium that lets the user know how much of the growing medium is wet in relation to the total volume of the growing medium and the user communicates this to the PWM system through its user interface and then the PWM system determines from this measurement and the dryness profile to set the appropriate dryness targets.

In general, in this simple embodiment, calibration comprises the user indicating or the system determining the times of saturation (start) and maximum permissible dryness (stop). This will provide two measurement points (ts, ws) and (td, wd), where ts is saturation time, ws is saturation weight, td is maximum dryness time and wd is maximum dryness weight. A dryness curve software component in the PWM system may then generate a dryness curve through those two points. In the simplest case this could be a straight line, although other curves, such as decaying exponential, piecewise linear, etc., could also be applied if the system designer determines that such a curve is more accurate either in general or for the given species and/or soil type and/or environment.

The time of maximum permissible dryness may be determined in different ways. One is straightforward: During calibration, the user observes the plant over time and indicates to the PWM system when maximum allowable dryness (minimum allowable wetness) has been reached. The PWM system may then set (td, wd) accordingly. The PWM system may also aid the user by causing an application (see component 1515 in FIG. 14) in the user's smart phone or the like to generate a running graph of actual wetness measurements over time, so that the user can see when the dryness profile has reached a minimally acceptable level. The user may then indicate to the PWM system that calibration is complete. Determination of (td, wd) could also be totally automatic: the PWS system may measure weight as a function of elapsed time since saturation and then set (td, wd) as the time and weight when the change in weight per time unit is less than some predetermined amount, that is, when the slope of the actually measured dryness curve is less than a predetermined threshold value.

In some embodiments, at least the general shape of the appropriate dryness curve may be plant species-specific. Especially in the embodiments in which the PWM system communicates with the user via a phone- or computer-installed application, the user may enter and/or choose an identifier of the plant species, such as the taxonomic binary nomenclature name, or a code provided by a grower, or simply its common name. As yet another option, any known application may be included in the user's smart phone that, via the phone's camera, photographically identifies the plant, and this identification can then be either entered or automatically transferred to the PWM user interface via the phone.

The identifier can then be used to address a database of corresponding pre-stored dryness curves. Such dryness curves may be made available for selection and entry by the user via an online database, or a database included in the PWM's user interface itself.

A pre-stored drying profile w(t) may in some cases be sufficient, but in general the actual drying profile of a potted plant will depend as well on factors such as soil type and pot type and volume (a bigger pot with more soil will hold more water and a clay pot will hold more water than a plastic one), as well as environmental factors such as local temperature, humidity, and solar intensity. In other words, an actual drying curve, also referred to as a weight data curve, is w=w(t, plant species, soil type, pot volume, environmental factors, other), such that the pre-stored drying profile w may be more or less accurate with respect to general shape, but not necessarily with respect to scaling.

One example of an "other" factor might be plant growth rate with a grow light: an environmentally stimulated growing plant will gain weight faster than a plant growing in the shade. In one embodiment, the user may enter into their PWM user interface one or more of the factors other than time t, whereby the PWM system, using predetermined experimental and computed data, generates an adjusted dryness profile for the user's particular potted plant. As yet another alternative, the user may select or load into the PMW system a dryness profile, but then still run a manual saturation-to-dry procedure as described above, whereupon the PMW system can adjust the selected dryness profile to match the thus experimentally determined measurements, with respect at least to time.

At the other end of the spectrum of sophistication, the PWM system may accumulate several actually measured values of some or all of the parameters of w, over some time period, and then apply machine learning techniques to generate a current dryness profile for the plant based on current measurements of those parameters, which the user may then download into the PWM component at the plant. This would enable a more accurate dryness profile during particularly hot, sunny, dry, etc., times.

As an intermediate alternative, the database of multiple drying profiles may still be plant-specific, but determined without machine learning techniques. Through manual calibration, the user may, for example, determine per-month or per-season or dormancy dryness profiles, or according to any other criterion, which could then be transmitted and loaded into the PWM component at the plant, either, all at once, or at the corresponding times or conditions.

The shape of a drying profile is relevant because of its predictive nature. In a very simple embodiment, the only notification transmitted to the user may be an indication that it is time to water the plant. Preferably, however, the PWM system, for example, via indicators, lights at the plant, or via the remote user interface, notify the user of when, in the future, the need for watering is expected. Consequently, if the dryness profile is linear, then when the weight has fallen to the halfway point (ws+wd)/2 between the measured ws and wd values, then it would also be anticipated that watering will be needed in twice the elapsed time from the saturation time. This will seldom be the case, however. If the dryness profile is decaying exponentially, however, it will reach the weight halfway value much faster, and unless the system takes this into account, it will notify the user to water the plant sooner than necessary.

As a simple example, assume that a potted plant goes from fully saturated to a minimum wetness level of 10% in ten days. If the actual drying profile for a given potted plant is linear then it will reach a half-dryness level ((ws+wd)/2) in five days and there are five days left until the plant needs to be watered again. If the actual drying profile is a decaying exponential function, however, the weight value ((ws+wd)/2) would be reached in only a little over 2½ days, meaning that the user could go on holiday for a whole week without having to water the plant. Drying profile shape thus plays a big role in the PWS system's predictive ability.

The controller may determine that the plant has been adequately watered based on the weight reaching the optimal level. The controller may determine that the plant has just been watered, or has been adequately or inadequately watered based on post watering slope 604 of the weight data curve, that is, the function w. The controller may also determine that the plant will need to be watered soon based on the near dry state slope 608, and may even indicate to the user an expected number of days remaining. The controller may also determine that the plant needs to be watered now based on the weight reaching the time-to-water level.

FIG. 7 shows an example of a weight data curve for a plant that thrives better by getting completely dry between waterings, such as a cactus or succulent plant. Similar to the weight data curve shown in FIG. 7, weight data curve 702 includes steeper post watering slope 704, mid-watering phase slope 706, and near dry state slope 708. Because this plant enjoys a longer dry state, a state that includes a time interval for the plant to stay dry, also shown here is a dry slope portion 709 of the dryness profile, which may be approaching a flat line, with zero or very close to zero slope. Also shown here is an optimal watering level 710 and time-to-water level 712. Because the slope of the weight data curve does not appreciably change during this dry slope phase 709, the controller may not signal the user to water the plant when the weight data curve first reaches optimal watering level 710, and may add an optimal period of time to account for dry slope phase 709 before alerting the user that the plant needs to be watered. This added time may be referred to as the dryness interval period. This interval time may change between seasons and be shorter in summer and longer in winter. To account for this, the interval time could be calculated by multiplying the time it takes for the current cycle to get from 100% wet to 100% dry by a multiplayer (2× or 3× for example). So if, for example, it takes 10 days to get from 100 to 0%, then the interval time is 20 or 30 days (which can be longer in winter if the decay time is itself longer.

Figure 8:
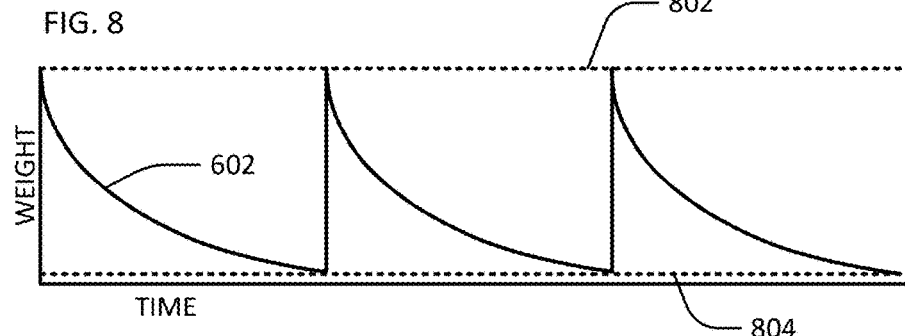
FIG. 8 shows weight data curve of FIG. 6 over 3 watering cycles.

FIG. 8 shows the weight data curve of FIG. 6 over three watering cycles. Shown here are weight data curve 602 and optimal watering level 802 and time-to-water level 804.

Figure 9:
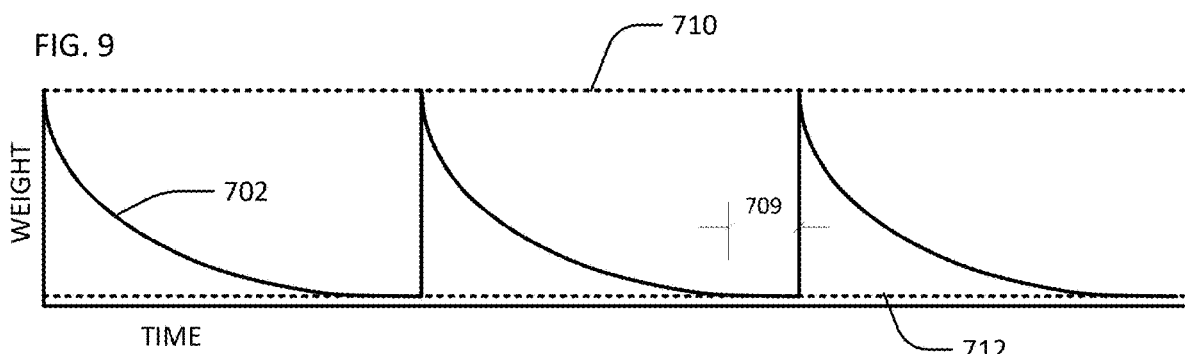
FIG. 9 shows weight data curve of FIG. 7 over 3 watering cycles.

FIG. 9 shows weight data curve of FIG. 7 over three watering cycles. Shown here are weight data curve 702 and optimal watering level 710 and time-to-water level 712, as well as dry delay period 709.

Figure 10:
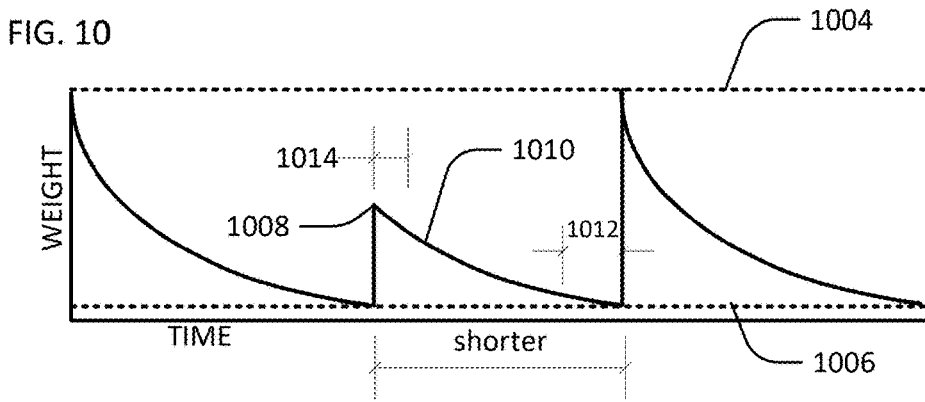
FIG. 10 shows a weight data curve indicating an under-watering of the plant at the second watering cycle.

FIG. 10 shows a weight data curve indicating an under-watering of the plant at the second watering cycle. Optimal watering level 1004 and time-to-water level 1006 are shown. It can be seen that the user did not water the plant up to the optimal water level during the second watering cycle, represented by weight data curve 1010, but instead only watered the plant up to weight level 1008. As a result, the post-watering slope 1014 is different than it would be if the plant had been adequately watered. For example, the slope may be less steep than if it had been adequately watered. The PWM system may adjust the watering algorithm as a result, for example, the system may alert the user to water sooner, or the system may adjust the algorithm to water the plant at a level other than the standard time-to-water level. The system may ask the user to water the plant to a level higher than optimal watering level 1004 at the next watering cycle. FIG. 10 shows the scenario where the PWM system analyzes the rest of the weight data curve for that watering cycle and indicates to the user when it is time to water based on time-to-water level 1006 and/or on near dry state slope 1012 and/or other features of the weight data curve.

Figure 11:
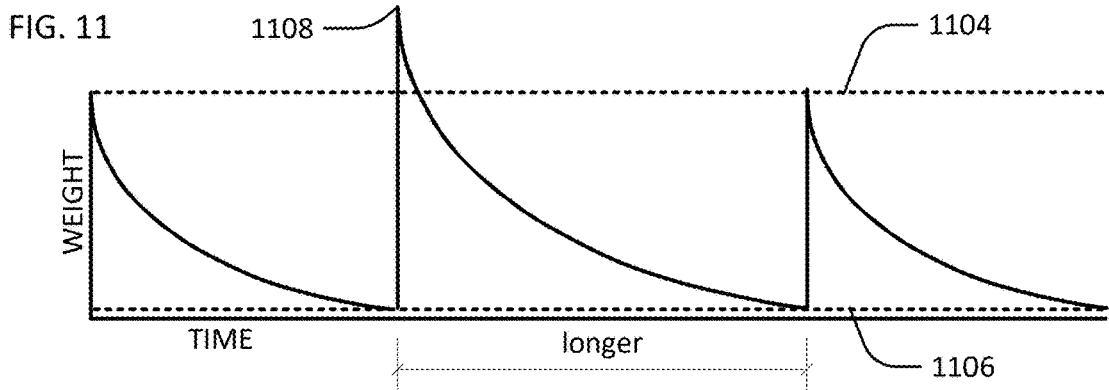
FIG. 11 shows a weight data curve indicating a PWM system with a "vacation mode" or "travel mode".

FIG. 11 shows a weight data curve indicating a PWM system with a "vacation mode" or "travel mode"—the user may need to leave the plant for a prolonged period of time without watering it. For example, the user may be leaving for two weeks, but normally waters the plant every ten days. The user may input this information into the system, for example, entering a time frame, for example, a number of days, during which the user will not be able to water the plant. The controller of the PWM system may then calculate a different optimal wetness level, which may be either higher or lower than the normal optimal level, to help prevent the plant from getting too dry before it can be watered again. As an alternative, the system may indicate an amount of water to be added to a water reservoir, if included. FIG. 11 shows normal optimal watering level 1104, as well as time-to-water level 1106. Also shown is a custom vacation watering level 1108 which allows the plant to survive longer than the usual watering cycle timeframe.

Figure 12:
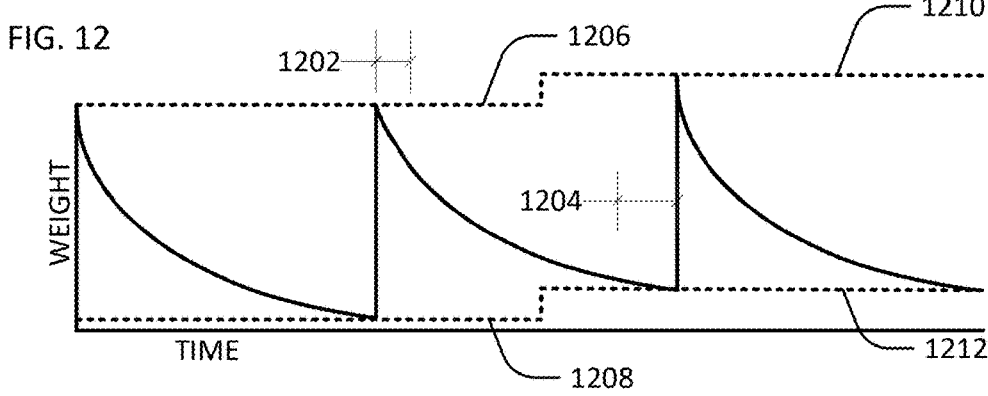
FIG. 12 shows a weight data curve indicating how the PWM system accounts for plant growth.

FIG. 12 shows a weight data curve indicating how the PWM system may account for plant growth. Plant growth adjustments may be made every watering cycle, or at set periods, or when the PWM system perceives one or more changes to the normal weight data curve, indicating the plant has grown an appreciable amount. For example, FIG. 12 shows a weight data curve where the slope immediately after watering is becoming less steep, indicating that the plant may not be receiving adequate water, even though the user is watering the plant to optimal watering level 1206. Post watering slope 1202 shows a less steep slope than previous watering cycle weight data curves. When this slope changes an appreciable amount, the controller of the PWM system may adjust the optimal watering level and/or the time-to-water level to account for the change, and to return the post-watering slope closer to optimal. For example, the optimal watering level 1206 may be increased to the optimal watering level 1210, and/or the time-to-water level 1208 may be increased to the time-to-water level 1212. These increases may be small depending on how often the PWM adjusts the levels to account for plant growth. Dry state slope 1204, and other features of the weight data curve may also be incorporated into the changes to the optimal watering and time-to-water level changes. It should be noted that a very similar if not identical routine may be used to also measure and account for a gradual decrease in the plant's mass over several cycles, and not just a gradual increase of the plant's mass over several cycles as described above. An example of gradual plant weight decreasing over several cycles would be a loss of leaves dues to changing weather conditions when entering a cooler season such as summer to fall or fall to winter.

Figure 13:
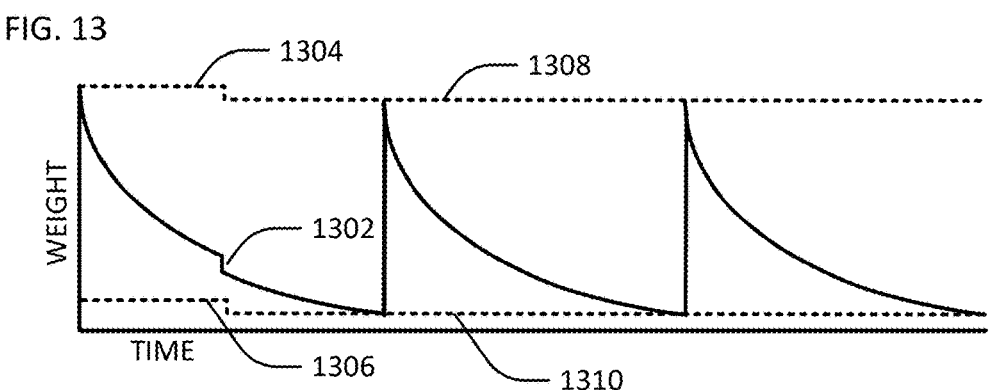
FIG. 13 shows a weight data curve where the plant's weight changed suddenly due to trimming of leaves, picking of fruit or other activity.

FIG. 13 shows a weight data curve where the plant's weight changed suddenly due to trimming or falling of leaves, picking of fruit, being partially eaten or damaged by a pet, or some other activity. In this instance, the PWM system may determine that such an event has taken place based on a sudden step function in the weight data curve, and adjust the time-to-water level and optimal watering level accordingly. Shown here is step function 1302 in the weight data curve, as well as initial optimal watering level 1304, adjusted optimal watering level 1308, initial time-to-water level 1306 and adjusted time-to-water level 1310.

As we are dealing with living, growing, changing things with stems, leaves and roots, there needs to be a threshold for allowable weight changes over time. The threshold itself may be a dynamic value which varies based on expected evaporation rates. Deltas in weight change larger than thresholds may alert users of anomalies in order to determine if a sudden weight change is intentionally caused by the user or by a natural event, in which case, a recalibration of the weight data curve may be necessary, or, is unexpected, and may just need a user's corrective action, for example, because a plant has tipped over. Adjustment of the weight data curve may be done in various ways, depending on the preference of the system designer. Since sudden weight changes will rarely depend on a sudden change within the growing medium, there will be only a relatively small deviation introduced by a lost portion of the plant such as a leaf or two. The system may, for example, assume that the drying profile has not changed. Assume that δw is the amount of the sudden weight change, where "sudden" means occurring over such a short time period that it is a substantial step change that could not have occurred through normal weight decrease based on water content or root growth. It may therefore compensate for the sudden weight loss by adding δw to each subsequent weight measurement, in effect acting as if the weight change never occurred. This will lead to approximately the same estimated time of a need for watering.

As mentioned, in some embodiments, a remote component of the PWM system includes a user interface, possibly within an application installed on a user device such as a smart phone, tablet, computer, etc. The user interface may include features such as:

photographic recognition of a plant species using a database of recognized plant species.

incorporating water needs data of the plant species into the plant maintenance algorithm.

step by step instructions for setup of the device and plant.

display of the weight data curve or a representation of the curve.

tracking of successful waterings and encouragement to continue a trend of successful waterings.

receiving plant size and species information.

indication of plant watering needs.

indication of plant maintenance needs.

prediction of plant watering and/or maintenance needs.

indication of plant status.

setup and monitoring of different modes, including vacation mode.

indication of predicted next watering day.

indication of plant health.

receive feedback from user as to plant status, health, size, and/or other factors.

indication that plant is healthy.

indication that plant is growing.

indication of how much plant is growing over time.

rewards for not missing plant waterings.

Example of Data Processing System

The routines, processes, storage functions, etc., described above must of course be performed by actual hardware and software components. FIG. 14 illustrates the main hardware and software components of one example of the type of system that may be used to carry out the various processes involved in embodiments of the invention. Some of the illustrated components may not be included in some implementations, and in others some of the main components may be combined.

At the highest level, the simplest implementation of the PWM system may comprise a main processing system 1400 and one or more sensors 1600, such as an arrangement to determine weight (such as strain gauges) 1602, wetness level and/or water level (for example, in a saucer) 1604, temperature 1606, as the soil probe 1608, an arrangement to determine balance 1610 (which could be the same as for weight, or a dedicated device such as an inertial sensor), etc., depending on which parameters are to be evaluated to determine when and how much to water a plant. Although FIG. 14 shows these as separate components, this is not necessary and what is considered the "the PWM system" could include the sensors as well.

The main processing system 1400 includes conventional functional layers, including system hardware 1410, on which processor-executable code installed at an application layer 1430 runs. In some systems, the main processing system may also include some form of system software such as an operating system, although it would also be possible in simple implementations to carry out the invention using firmware or even be hard-coded into a single-board computer such as a PCB controlled or the like.

The system hardware will include standard components such as at least one processor 1411, volatile and/or non-volatile memory and/or storage, indicated "collectively" as component 1412, and standard I/O access components 1413 to enable communication with other components, entities and systems over any known type of network, wireless or wired. The processor-executable code organized as software modules used to carry out the various computations, routines, and functions described above may be stored and thus embodied in either or both types of memory/storage components 1412. The software modules will thus comprise processor-executable code that, when run by the processor(s) 1411, cause the processor(s) to carry out the corresponding functions.

A component 1414 may also be included to receive signals from whichever sensors (in particular, a force- and thus weight-measuring arrangement) the designer has chosen to include to help evaluate the dryness state of the plant.

Depending on the chosen platform, some form of system software 1420 may also be included, such as an operating system.

Again, depending on how the PWM system is implemented, it may also include an application layer 1430, which comprises various software components/modules for performing the functions described above. Of course, even "applications" are in practice bodies of processor-executable code that are stored in hardware components such as 1412, but are usually shown separately for clarity and ease of understanding.

In FIG. 14, the application layer is shown as having an evaluation module 1432 that determines the watering state of the plant as a function of time, input from a timer component 1433, which may simply be code within the evaluation module itself that uses the hardware system or an internal clock as a time base. The evaluation module 1432 also inputs from a parameter component 1434 the values $\bar{x}$ from the various sensors 1600, via, for example, the sensor component 1414 and uses them, and elapsed time, and determines where on the drying profile the plant's current state lies. The parameter component 1434 and/or the sensor component 1414 may use known techniques to convert the signals from the sensors 1600 into values suitable for dryness evaluation, for adjusting the current dryness profile or the elapsed time value, as needed, etc. One or more drying profiles may be stored in the PWM system itself, for example, as a component 1435, or input from other entities such as from a user device 1500 or from another remote system such as a server operating in the "cloud" 1700.

A notification module 1436 is preferably also included to receive the results of the evaluation module 1432 and generate whichever notices to the user that the system designer has chosen to provide for. In one embodiment, this may be simply a notice that it is time to water the plant. In other embodiments, the notice indicates when it is estimated that watering will be needed, based on the current drying profile. Examples of other dryness-related notifications are given above, but there may be other types of notifications as well that do not relate to the time for watering or be based on a dryness profile at all. For example, if the PWM system senses that the plant has tipped over, or that the temperature has risen above or dropped below a level the plant can withstand, then a notice may be issued to the user of such conditions as well so that the user can take corrective action. In implementations that include the Water Assist feature described above, the evaluation module will perform the corresponding evaluations and may direct the notification module 1436 to issue the corresponding notices to the user.

In some embodiments, the main PWM system communicates with a user via a remote system 1500 associated with the user, for example, the user's smart phone, tablet, laptop, etc. To be able to interpret the information from the PWM system, and to be able to send commands The remote system 1500 will include all conventional hardware and system software components, including devices 1514 that enable it to connect to networks. A graphical user interface 1516 is preferably also installed in the user's remote system to enable the user to see the information such as notifications transferred from the PWM system and to enter information and other commands, for example, selecting a drying profile to apply or sending to the PWM system an identifier of the plant so that it can select the appropriate profile.

The PWM system 1400 and the user's remote device may in some embodiments be used "cooperative" to create drying profiles. For example, if the PWM system 1400 connects in any known way with the user's system 1500, it could input raw data from the sensors 1600, after any necessary processing by the PWM system, during a calibration phase that is used to construct a plant-specific drying profile, or to signal to the user when she has added enough water to reach the initial saturation level, etc. In other words, the application 1515 could itself compile the data sufficient to create a drying profile for the given plant.

In some embodiments, drying profiles or other information may be stored in yet another remote system 1700 in the "cloud". In this case, the remote system may store and manage a database 1710 of drying profiles that the user or PWS system itself may access and download.

The invention claimed is:

1. A system for maintaining plants, where each plant is in a container with growing medium, comprising:
   a processor;
   at least one storage device;
   a user interface;
   a weight sensor;
   said processor being operably coupled to the weight sensor via a sensor component;
   an evaluation module comprising code that is stored in the at least one storage device and that, when executed by the processor, causes the processor
       to determine a drying profile as a time-dependent function of a total weight, said total weight including the weight of the container, of the growing medium, of water contained within the container, and of the plant;
       over time, to input at least one weight measurement from the weight sensor and, from the at least one weight measurement, to determine the total weight; and
       via the user interface, to give an indication to a user of an estimate of a future time when the total weight will have fallen below a predetermined allowable minimum level, indicating that a user should water the plant.

2. The system of claim 1, in which the evaluation module is further configured to determine the drying profile also as a function of estimated plant weight change, and thus time-dependent weight change.

3. The system of claim 1, in which the evaluation module is further configured to provide to the user an indication of a proper amount of water to be added into the container to achieve a desired maximum saturation level of the growing medium, as a function of the measured total weight.

4. A method for maintaining plants, where each plant is in a container with growing medium, comprising:
   determining a drying profile that is a time-dependent function of a total weight, said total weight including the weight of the container, of the growing medium, of water contained within the container, and of the plant;
   automatically, over time, inputting into a processor, via a sensor component, a series of measurements of the total weight obtained from a weight sensor;
   via an evaluation module, automatically determining, by using at least one of the measurements of the total weight as an argument in the drying profile, an estimate of a future time when the total weight will have fallen below a predetermined allowable minimum level, which is also a latest time by which, a user should water the plant; and via a user interface, indicating the latest time to the user.

5. The method of claim 4, further comprising determining the drying profile also as a function of growing medium type.

6. The method of claim 4, further comprising determining the drying profile also as a function of season.

7. The method of claim 4, further comprising determining the drying profile also as a function of the volume of the container.

8. The method of claim 4, further comprising determining the drying profile through pre-calibration, by:

at an initial time, saturating the growing medium in the container with the plant;

from the initial time, determining a maximum elapsed time as a time at which wetness of the growing medium has reached an estimated minimum allowable level; and setting the drying profile such that the time at which the wetness level is estimated to be equal to the predetermined minimum allowable level is the maximum elapsed time.

9. The method of claim 4, further comprising giving an advanced indication to the user of when to water the plant as a function of the drying profile and the elapsed time.

10. The method of claim 4, further comprising selecting the drying profile from a set of species-dependent drying profiles, in which the plant is of a known species and the species-dependent profile corresponds to the known species of the plant in the container.

11. The method of claim 10, comprising obtaining the drying profile from an external database.

12. The method of claim 4, further comprising determining the drying profile also as a function of at least one environmental factor.

13. The method of claim 12, in which the at least one environmental factor is chosen to be at least one of: ambient temperature, ambient humidity, ambient sunlight intensity, ambient pressure, soil composition, wind speed/pressure, and precipitation.

14. A method for maintaining plants, where each plant is in a container with growing medium, comprising:

determining a drying profile as a time-dependent function of a total weight, said total weight including the weight of the container, of the growing medium, of water contained within the container, and of the plant;

over time, measuring the total weight; and giving an indication to a user of a need to water the plant when the total weight is measured to have fallen below a predetermined minimum level.

15. The method of claim 14, further comprising determining the drying profile also as a function of estimated plant weight change, and thus time-dependent weight change.

16. The method of claim 14, further comprising providing an indication to the user of a proper amount of water to be added into the container to achieve a desired maximum saturation level of the growing medium, as a function of the measured total weight.

\* \* \* \* \*